W. S. SCHUYLER.
DIRIGIBLE HEADLIGHT FOR AUTOMOBILES AND OTHER VEHICLES.
APPLICATION FILED FEB. 25, 1911.
1,116,499.
Patented Nov. 10, 1914.
3 SHEETS—SHEET 1.
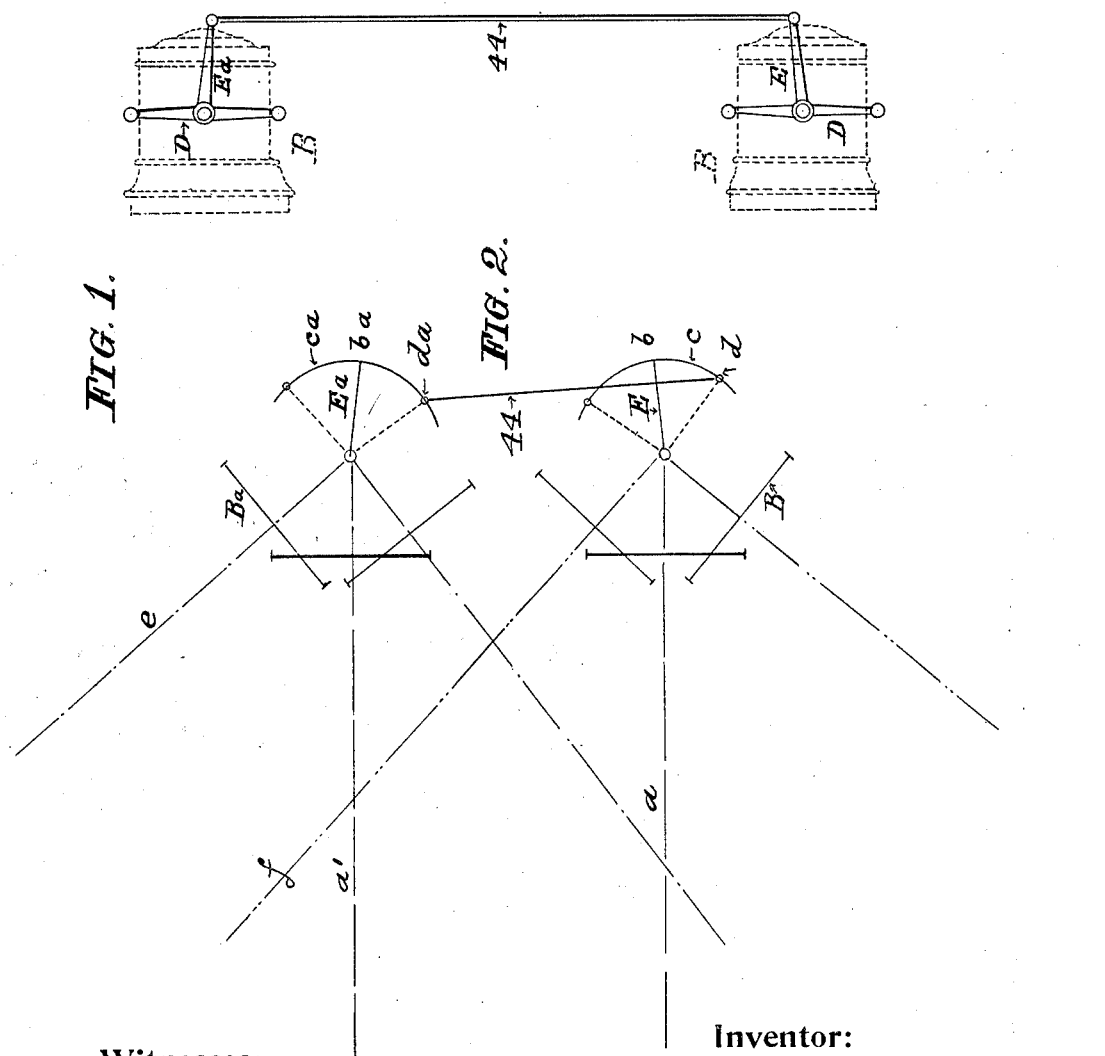

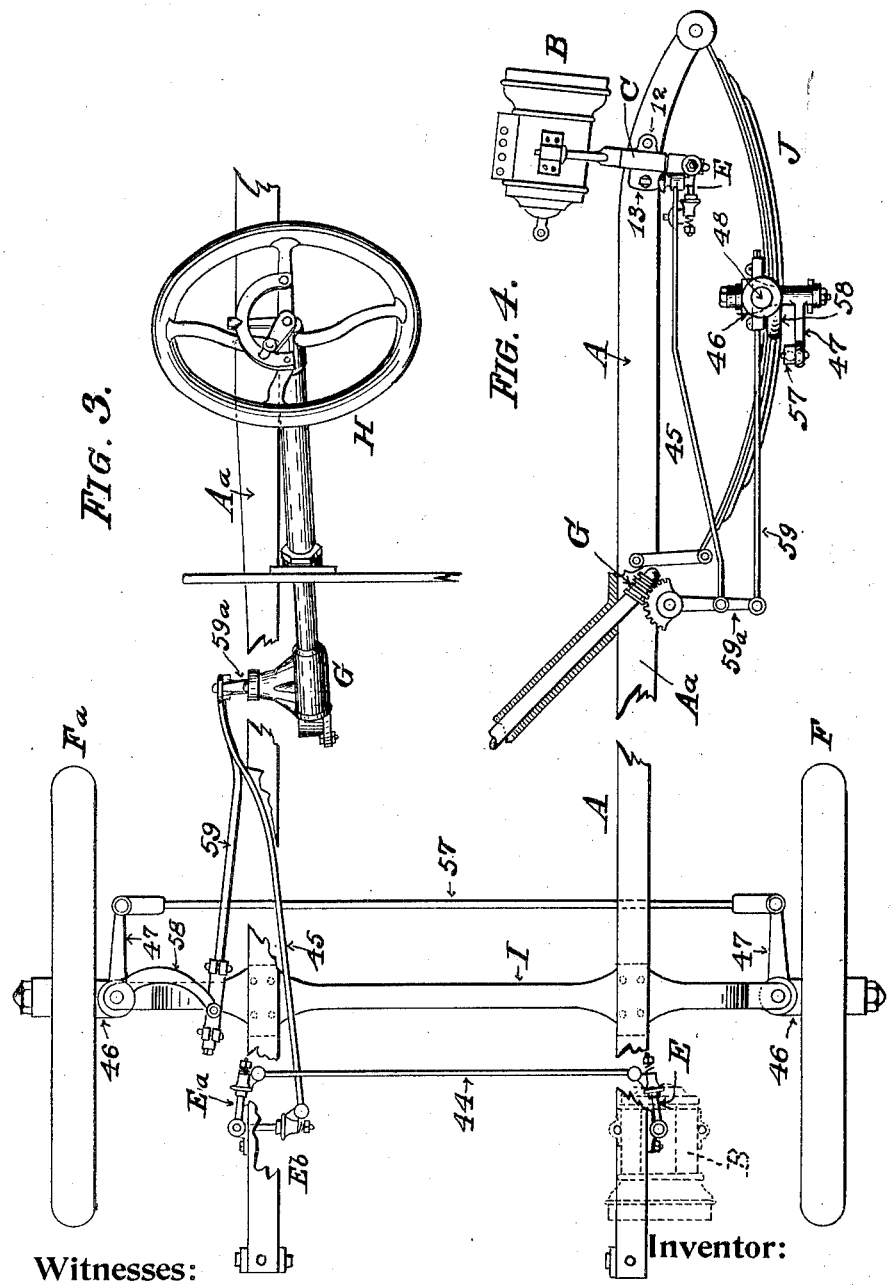

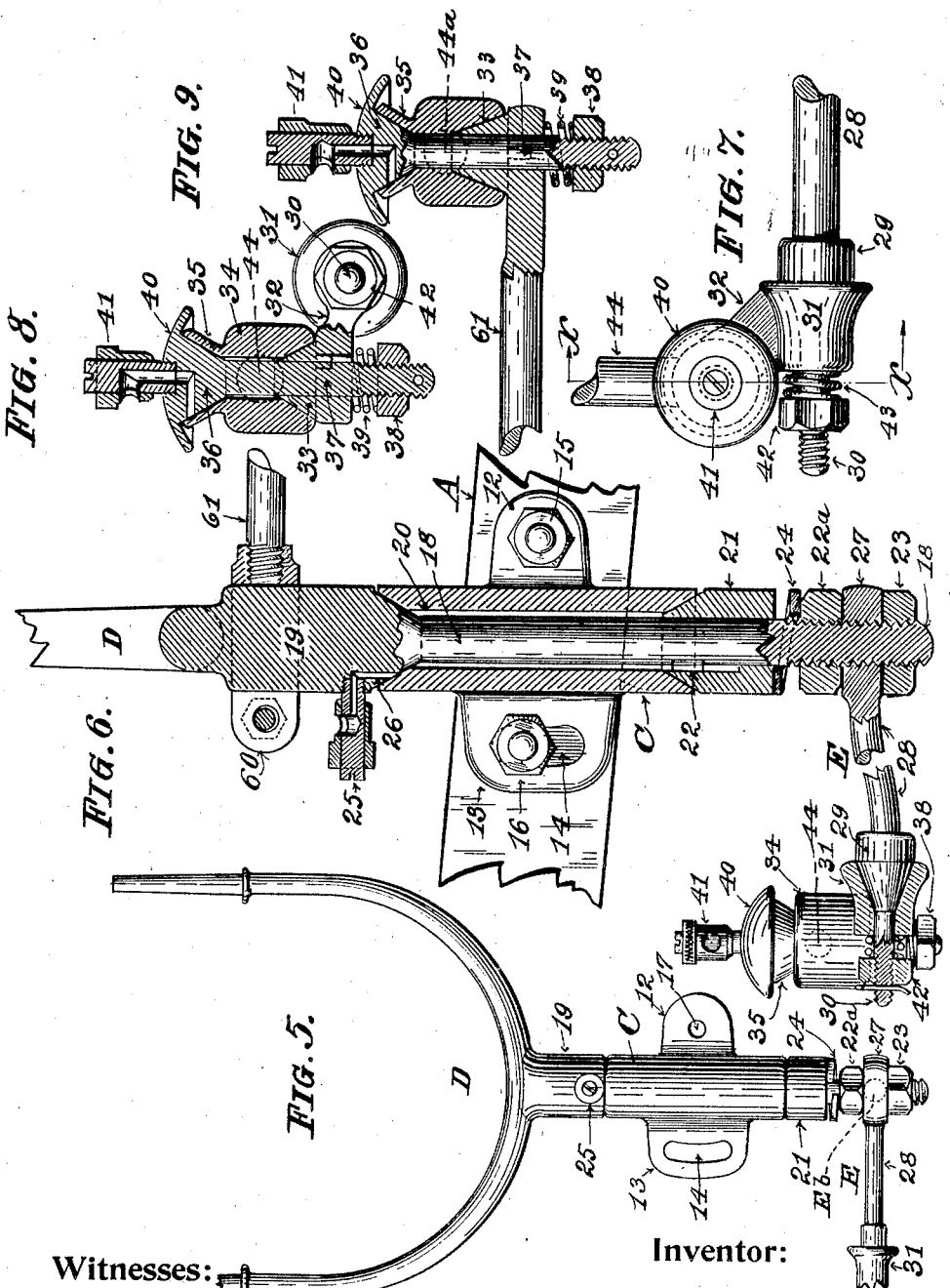

UNITED STATES PATENT OFFICE.

WILTON S. SCHUYLER, OF SAVANNAH, MISSOURI.

DIRIGIBLE HEADLIGHT FOR AUTOMOBILES AND OTHER VEHICLES.

1,116,499. Specification of Letters Patent. Patented Nov. 10, 1914.

Application filed February 25, 1911. Serial No. 610,844.

*To all whom it may concern:*

Be it known that I, WILTON S. SCHUYLER, a citizen of the United States, and resident of Savannah, in Andrew county, State of Missouri, have invented certain new and useful Improvements in Dirigible Headlights for Automobiles and other Vehicles; and I do hereby declare that the following description of my said invention, taken in connection with the accompanying three sheets of drawings, forms a full, clear, and exact specification, which will enable others skilled in the art to which it appertains to make and use the same.

This invention has general reference to dirigible headlights for automobiles and other vehicles; and it consists, essentially, in the novel and peculiar combination of parts and details of construction, as hereinafter first fully set forth and described, and then pointed out in the claims.

In the drawings already referred to, which serve to illustrate this invention more fully, Figure 1 is a diagrammatic plan of a pair of headlights illustrating the normal position thereof when attached to a vehicle. Fig. 2 is a similar view illustrative of the various positions of the headlights and the means employed for connecting the same, no attempt being made to disclose details of construction of the parts. Fig. 3 is a plan of a portion of an automobile showing the normal position of the headlights and the mechanism which operates the same in unison with the steering mechanism, one of the headlights being omitted to disclose underlying parts, the other headlight being shown in dotted lines. Fig. 4 is a side elevation, partly in section, of a fragment of the automobile and one of the headlights. Fig. 5 is an elevation of one of the headlight-supporting means detached. Fig. 6 is a longitudinal sectional elevation of the same. Fig. 7 is a plan of one of the universal joint connections employed in this construction. Fig. 8 is a sectional view on line *x x* of Fig. 7. Fig. 9 is a like view of a single joint connection employed in this device.

Like characters and symbols of reference indicate the same parts in all the figures.

The object of this invention is the construction of effective, durable, and self-adjusting means for directing the headlights of an automobile and other vehicle automatically in the direction in which the vehicle is about to turn, said directing-means being connected to, and operating simultaneously with, the steering mechanism of said vehicle. In the construction of a device of this nature, it is essential that the various joints, rod-connections, and bearings be, as far as possible, noiseless or anti rattling; that the same be automatic or self-adjusting to compensate for wear, and that the various adjustments of levers, arms, &c., can be made in the easiest manner and in a short space of time. To attain these various advantages and results, I construct the device in the preferred embodiment of my invention, as follows: A, $A^a$, in the drawings designate the main members or frame of an automobile or similar vehicle to which headlights B, $B^a$, are secured by means of supports comprising, each, a tubular member or socket C, having a centrally-located, laterally-projecting pivoting-lug 12, at one side, and a fastening-lug 13, at the opposite side, there being in the latter lug a curved slot 14, whereby said tubular member C is adapted to be tilted forwardly so as to project the rays of light issuing from the headlight downwardly in advance of the car or vehicle, as will hereinafter more fully appear, a pivotal-bolt 15, being passed through the bolt-hole 17 in the lug 12, and a second bolt 16, being passed through the curved slot-hole 14, to securely fasten the tubular member C to the main-frame member.

In the tubular member C there is, rotatably mounted, a spindle 18, having at its upper end a fork or yoke D, to which the headlight B is removably secured. This spindle 18 connects with the yoke D by a cylinder the lower end of which is formed to a cone 19, preferably integral with the spindle 18, said cone 19 engaging the correspondingly-shaped upper end of the bore 20 of said tubular body C, said spindle having near its lower end a movable cone 21, engaging the conical lower end of said bore 20, said cone 21 being prevented from rotating upon said spindle by a spline 22, as indicated in Fig. 6.

The lower end of the spindle 18 is externally screw-threaded to receive, first, an adjusting-nut $22^a$, and then an arm E, and, finally, a locking-nut 23. Between the upper face of this adjusting-nut $22^a$, and the lower face of the cone 21, there is located a spring 24, the function of which is to push the lower, movable, cone 21 upwardly, and the cone 19 downwardly in close contact with the coacting tapering surfaces of the bore of the tubular member or socket C. And for the purpose of providing proper lubrication of the coacting surfaces, an oil-cup 25, is screwed into the upper portion of the part 19, which by veins or passages 26, permits lubricating oil being introduced to the cone bearings in an obvious manner.

I will here state that the two headlights and their supporting means are alike in construction and that the description as above set forth with reference to one of these supporting means, (and for that matter all the parts hereinafter to be described except where otherwise stated) applies also to the other of these supports.

The arms E, E$^a$, of which there is one on each spindle, comprise an eye 27, on a rod 28, near one end of which there is a cone 29, preferably formed integral with said rod 28, said rod terminating in an externally screw-threaded shank 30. This cone 29 is constructed to engage a bell-shaped member 31, which member has a laterally-projecting part 32, which has on its upper surface a cone 33, which is centrally punctured, said cone 33 being engaged by a sleeve 34, the lower end of its bore being tapered to receive said cone 33, there being formed on the upper end of said sleeve 34 a conical part 35, adapted to receive a cone 36, said latter cone having a shank 37, the lower end of which passes through the cone 33 and is externally screw-threaded to receive an adjusting nut 38, a spiral spring 39, being interposed between said nut 38 and the lower face of the laterally projecting member 32, to draw the cones in close contact with the respective conical seating-members. The upper cone 36 is, preferably, formed with an overhanging dome 40, to protect the underlying parts from dust, grit, &c., and it is provided with an oil cup 41, to provide for efficient lubrication of the cone-shaped bearings 33 and 36. Upon the screw-threaded shank 30 of the arm E there is located an adjusting-nut 42, and between this nut and the outer face of the bell 31, there is a spiral spring 43, which serves to draw the cone 29 in contact with the conical bore of the bell-shaped member 31.

It will now be observed that by the introduction of the cone-shaped bearings 19 and 21 in the tubular member C, one of which bearings is longitudinally movable upon the spindle 18, and the introduction of the spring 24 and adjusting nut 22$^a$, the yoke D with its headlight B is prevented from rattling and at the same time any wear of these cone-shaped bearings is automatically taken up by said spring 24. It will also be observed that these results are likewise obtained by the construction disclosed with reference to the arms E, E$^a$.

As heretofore stated, there are two arms E, E$^a$, one at each outer side of the frame-members A, A$^a$, and these arms are connected to each other by a rod 44. One of these arms, E$^a$, is provided with an auxiliary arm E$^b$, bell-crank fashion, the arm E$^b$ being connected to an arm 59$^a$, which is a part of the vehicle steering mechanism G, by a rod 45, to operate in unison with the means that govern the position of the forward steering traction-wheels F, F$^a$, when the vehicle is in motion. These forward steering-wheels are mounted upon the spindles 48 of the usual knuckles 46, which knuckles have rearwardly projecting arms 47, connected to each other by a connecting-rod 57. On one of these knuckles 46 there is a further arm 58, which connects with the arm 59$^a$ already mentioned by a rod 59 so that when the hand-wheel H of the steering-mechanism is rotated in one or the other direction, both the steering-wheels and the headlights will move in a corresponding direction.

I desire to call attention to the fact that when in normal position, the headlights B, B$^a$, are slightly inwardly turned so that the rays of light issuing from the headlights converge to merge into each other at a distance of from 75 to 100 feet in advance of the vehicle, this angularity being, however, so slight that in the illustrations in Figs. 1 and 2, this angularity, which is approximately one degree only, is not shown, and that each headlight is also slightly forwardly tilted, as shown in an exaggerated condition in Fig. 4, to throw the rays of light upon the ground at the focal point of the merged rays of light. The arms E, E$^a$, however, are in their normal position turned inwardly toward each other, as shown in Figs. 1, 2, and 3. The result is that when the two headlights are turned from their normal position, say to the right, these rays of light will no longer converge but will diverge so as to spread the light at the places where it touches the ground. This condition is graphically illustrated in Fig. 2, where the lines a, a', denote the normal direction of the light from the two headlights. The arms E, E$^a$, converge, their ends b, b$^a$, describing the arcs c, c$^a$, so that when the arm E$^a$ reaches the point d$^a$, the direction of the light from the headlight B$^a$ will be along the line e, while the arm E, having reached the point d, the direction of the light from the headlight B will be along the line f, thus demonstrating that the two lines e f diverge, the angle of divergence depending upon the angular position of the arms E, E$^a$. This feature of my invention is a very important one for the reason that by spreading the light over a larger area when turning in a road, the operator of the vehicle is enabled to take the turn at a greater speed with a greater assurance of safety than would otherwise be advisable. It is evident that the action of the headlights is the same whether the vehicle turns to the right or to the left, the diagrammatic illustration of Fig. 2 clearly indicating the positions of the headlights when turned in either direction.

By connecting the various rods to the arms as described, I avoid not only the rattling noises, but also attain the advantages that the wear of the moving parts is automatically taken up, and that the twisting strain to which these rods are subjected when the relative positions of the axle I, and the frame members A, A$^a$, change due to the compression of the springs J, when the vehicle is running or being loaded with passengers or freight.

In the various figures of the drawings it is assumed that there are no parts outside of the frame members which will interfere with the rods being run as described. There is, however, a condition sometimes present which will prevent the headlights from being placed on the outside of the frame-members A, A$^a$, and the running of the rod 44 below, as for instance when shock-absorbers of a certain construction are used which have to be placed on the outside of the frame-members A, A$^a$. In this case I locate the headlight supporting members on the inside of the frame-members, and when there is no room below to permit of the connecting rod 44 being placed below, I shall provide the part 19 of the yoke D with a clamping member 60, as shown in Fig. 6, and furnish the same with a rod 61, and provide this rod with anti-rattling and self-adjusting cones, as shown in Fig. 9, the same as heretofore described with reference to the universal-joint connection illustrated in Fig. 8, and then connect these by a rod 44$^a$ instead of the rod 44, it being understood that the rods 61 in the latter case take the place of the arms E, E$^a$, and that they are convergingly arranged the same as these arms E, E$^a$, when actually employed.

In assembling the headlight-supporting brackets, the adjusting nuts 22$^a$ are first applied to tension the springs 24, after which the arms E, E$^a$, are placed upon the spindles 18, and then the locking-nuts 23 screwed up tight against the eyes 27 of the arms, whereby these arms are very securely fastened upon the spindles but may be readily adjusted should a change in the angular position of the headlights become necessary or desirable.

Having thus fully described the preferred embodiment of my invention, I desire it understood that many of the details of construction hereinbefore set forth may be varied by persons skilled in the art to which this invention appertains without departing from the scope of the following claims.

I claim—
1. In a dirigible headlight for automobiles and other vehicles, the combination, of supporting-brackets for said headlights, each of said supporting-brackets including a tubular member having securing-lugs, a yoke to which the headlight may be attached, said yoke having a shank or spindle, cone-bearings on said spindle one of which is movable thereon, a spring constructed to press upon the movable cone, an arm upon said spindle, an adjusting-nut upon said spindle constructed for adjustment of the tension of said spring, and a locking-nut upon said spindle below said arm.

2. In dirigible headlights for automobiles and other vehicles, the combination with headlights, of supporting means for the same and mechanism for rotating said headlights in substantially horizontal planes, the latter mechanism including arms which are convergingly connected to said headlights and means for connecting said arms, the latter means including a cone on each arm, a bell-shaped receiving member for said cone, said bell-shaped receiving member having a laterally projecting part terminating in a punctured cone, a sleeve upon said cone, said sleeve being taperingly bored at its ends, a cone in the upper tapering bore of said sleeve, said latter cone having a shank, and a rod connecting the two sleeves, there being upon the shank a spiral spring and an adjusting nut for tensioning said spring, said arms terminating in externally screw-threaded shanks, there being a spring and an adjusting nut upon each shank for tensioning said springs.

3. In dirigible headlights for automobiles and other vehicles, a support for the headlight comprising a tubular body the bore of which has tapering portions at its ends, lugs on said body by which it is adapted to be secured to said vehicle, a yoke, a spindle on said yoke, said spindle having a cone adapted to engage the upper taper of said bore, a further cone splined to said spindle and constructed to engage the lower tapering bore of said tubular body, a spring below said movable cone, an adjusting nut upon said spindle constructed to press upon said movable cone and serve as an abutment, an arm on said spindle below said adjusting nut and abutting against the same, and a locking nut on said spindle constructed to fasten said arm to said spindle.

4. In a device of the nature described, an arm for rotating headlights on automobiles and other vehicles, said arm comprising a rod adjustably secured to the lower end of the spindle by which said headlight is rotated, a cone near the end of said rod, said rod being externally screw-threaded at its end beyond said cone, a bell-shaped member constructed to engage said cone, a laterally-projecting member on said bell-shaped member, a punctured cone upon said laterally-projecting member, a sleeve, said sleeve being taperingly bored at its ends, one of said bores being adapted to engage the cone on the laterally-projecting member, a spindle in said body, said spindle having a fixed cone adapted to engage the upper tapering bore of said sleeve, a connecting rod projecting from said sleeve, and means on said arm and said spindle constructed to keep the tapering bodies in contact with the tapering bores of the respective parts, as described.

In testimony that I claim the foregoing as my invention, I have hereunto set my hand in the presence of two subscribing witnesses, at Chicago, Ill., this 23d day of February, 1911.

WILTON S. SCHUYLER.

Witnesses:
MICHAEL J. STARK,
A. G. PETERSON.

Copies of this patent may be obtained for five cents each, by addressing the "Commissioner of Patents, Washington, D. C."